US008959495B2

(12) United States Patent
Chafi et al.

(10) Patent No.: US 8,959,495 B2
(45) Date of Patent: Feb. 17, 2015

(54) UNIFYING STATIC AND DYNAMIC COMPILER OPTIMIZATIONS IN SOURCE-CODE BASES

(75) Inventors: Hassan Chafi, Foster City, CA (US); Mason Chang, Arcadia, CA (US); Eric Sedlar, Portola Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 136 days.

(21) Appl. No.: 13/620,124

(22) Filed: Sep. 14, 2012

(65) Prior Publication Data
US 2014/0082597 A1    Mar. 20, 2014

(51) Int. Cl.
*G06F 9/45* (2006.01)
(52) U.S. Cl.
USPC ............ 717/145; 717/140; 717/148; 717/153
(58) Field of Classification Search
CPC ........................................ G06F 9/455–9/45558
See application file for complete search history.

(56) References Cited

U.S. PATENT DOCUMENTS

| 5,590,329 | A | 12/1996 | Goodnow et al. | |
|---|---|---|---|---|
| 5,907,709 | A | 5/1999 | Cantey et al. | |
| 6,151,703 | A | 11/2000 | Crelier | |
| 6,259,958 | B1 | 7/2001 | Steinman et al. | |
| 6,327,704 | B1 * | 12/2001 | Mattson et al. | 717/153 |
| 6,427,234 | B1 * | 7/2002 | Chambers et al. | 717/140 |
| 7,200,837 | B2 | 4/2007 | Stevens | |
| 7,689,979 | B1 | 3/2010 | Sawyer et al. | |
| 7,996,826 | B2 * | 8/2011 | Park et al. | 717/148 |
| 8,136,103 | B2 * | 3/2012 | Cascaval et al. | 717/145 |
| 2006/0048114 | A1 * | 3/2006 | Schmidt | 717/148 |
| 2006/0090157 | A1 * | 4/2006 | Park et al. | 717/140 |
| 2006/0130021 | A1 | 6/2006 | Plum et al. | |
| 2007/0157166 | A1 | 7/2007 | Stevens | |
| 2007/0168949 | A1 | 7/2007 | Shattuck et al. | |
| 2009/0064113 | A1 * | 3/2009 | Langman et al. | 717/148 |

(Continued)

FOREIGN PATENT DOCUMENTS

EP        1618474 B1 *  3/2004  ................ G06F 9/46

OTHER PUBLICATIONS

Wang, Chih-Sheng et al., A Method-Based Ahead-of-Time Compiler for Android Applications, 2011, pp. 15-24.*

(Continued)

*Primary Examiner* — Thuy Dao
*Assistant Examiner* — Christopher Franco
(74) *Attorney, Agent, or Firm* — Hickman Palermo Truong Becker Bingham Wong LLP (57) ABSTRACT

Techniques are described for unifying static and dynamic compiler optimizations in source code bases. In an embodiment, a first compiler compiles source code of a target function to generate ahead-of-time (AOT) compiled machine code. A second compiler compiles the source code to generate an intermediate representation (IR) of the target function. In response to determining that the target function should be just-in-time (JIT) compiled, the AOT-compiled machine code for the target function is linked to the IR of the target function. During runtime, a physical processor executes AOT-compiled machine code of an executable program. When the target function is encountered for the first time, a JIT compiler is invoked. The JIT compiler generates JIT-compiled machine code for the target function. The physical processor executes the JIT-compiled machine code in place of the AOT-compiled machine code for the target function.

16 Claims, 4 Drawing Sheets

(56) References Cited

U.S. PATENT DOCUMENTS

2009/0249316 A1* 10/2009 Cascaval et al. .............. 717/145
2009/0282393 A1 11/2009 Costa et al.
2011/0246974 A1* 10/2011 Kawachiya et al. .......... 717/148
2014/0157247 A1 6/2014 Chang et al.

OTHER PUBLICATIONS

Lim, Yeong-Kyu et al., A Selective Ahead-of-Time Compiler on Android Device, 2012, 6 pages.*
Fulton, Mike et al., Compilation Techniques for Real-Time Java Programs, 2007, 11 pages.*
Arnold, Matthew et al., Dynamic Compilation and Adaptive Optimization in Virtual Machines, 2006, 184 pages.*
Erhardt, Christoph et al., Exploiting Static Application Knowledge in a Java Compiler for Embedded Systems: A Case Study, 2011, pp. 96-105.*
Bohm, Igor et al., Generalized Just-in-Time Trace Compilation using a Parallel Task Farm in a Dynamic Binary Translator, 2011, pp. 74-85.*
U.S. Appl. No. 13/690,513, filed Nov. 30, 2012, Notice of Allowance, Jul. 17, 2014.

* cited by examiner

UNIFYING STATIC AND DYNAMIC COMPILER OPTIMIZATIONS IN SOURCE-CODE BASES

FIELD OF THE INVENTION

The present disclosure relates, generally, to compiler optimizations and, more specifically, to techniques for unifying static and dynamic compiler optimizations.

BACKGROUND

A compiler is a computer program that translates source code conforming to a programming language into object code conforming to another language. In many instances, the object code is machine code that can be directly executed by a physical machine, such as a central processing unit (CPU). For example, the object code may include a set of binary instructions that can be directly loaded and executed by the CPU. The object code is typically much more difficult for a human user to read and understand than the programming language code, but enables the target machine to carry out the instructions specified in the source code.

Traditional compilers that compile legacy source code bases, such as code conforming to the C programming language, rely on ahead-of-time (AOT) compilation, also known as static compilation, to generate object code. AOT compilers translate the source code of a particular program into machine code before the program begins execution. This approach avoids any potential latencies associated with run-time compilation and conserves resources associated with the run-time environment. However, the pre-compiled code must be fully functional and cannot be optimized using runtime information.

Another approach to compiling source code involves "just-in-time" (JIT) compilation, also referred to as dynamic translation. This approach is used for more modern and dynamic programming languages, such as code conforming to the Java® programming language. Specifically, Java® source code is compiled to bytecode that can be run on any Java® Virtual Machine (JVM) regardless of the CPU architecture of the computer executing the JVM. During program execution, the JVM executes the bytecode by using a JIT compiler to dynamically convert the bytecode instructions into native machine code. In contrast to AOT compilers, the JIT compiler is able to accomplish performance boosts by analyzing runtime feedback to optimize the machine code based on the current program state.

Many large source code bases were initially written in static programming languages and optimized for specific AOT compilers. While the benefits of dynamic translation could potentially provide further optimizations to these legacy source code bases, rewriting the source code bases into a dynamic programming language would require enormous overhead and nullify many of the AOT-specific optimizations.

In order to leverage the benefits of JIT compilation, some runtime environments are configured to apply dynamic compilation techniques to static languages. According to one such approach, a virtual machine (VM) uses an AOT compiler as a backend compiler. Specifically, the virtual machine, which executes a dynamic programming language, profiles the code and produces optimized C code based on the runtime information. The VM then invokes a traditional AOT C compiler to generate compiled code. The VM treats the C compiler as a black box. Thus, the optimizations are limited to the source code and cannot be fine-tuned at the machine code layer. In addition, this approach relies on the source code initially being written in a dynamic programming language, and the overhead from constantly generating optimized C code can be significant.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described for unifying static and dynamic compiler optimizations in legacy or other source-code bases. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to embodiments described herein, a system unifies AOT and JIT compilation techniques to generate optimized machine code for a particular source code base. These techniques can be applied to legacy source code bases without significantly changing the code base itself. Therefore, the amount of overhead from the perspective of a developer is minimal, and compiler-specific optimizations can be maintained.

The techniques further enable dynamic optimizations of traditionally static program languages, such as C. In an embodiment, JIT compilation is applied to generate specialized compiled code on a per program instance basis based on the current state of the program. In addition, JIT compilation may generate specialized code from the static program language based on the actual underlying hardware. These and other advantages are discussed below with reference to various embodiments and the accompanying figures.

In an embodiment, one or more portions of particular program are compiled twice using two different compilers. A host compiler generates machine code from the program's source code. Another compiler is a frontend compiler that generates a serialized intermediate representation (IR) from the source code. The generated IR may be used to dynamically optimize and compile code during runtime, as discussed in further detail below.

In an embodiment, a mechanism is generated to detect which portions of the particular program should be JIT compiled. For example, a preprocessor flag, macro, or any other suitable identifier may be used to mark a particular function of the program. The AOT compiled code corresponding to the marked portions are linked to the corresponding IR representation generated by the frontend compiler.

At program startup, the processor executes the machine code generated by the host compiler. During runtime, when an identifiable portion of the program should be JIT compiled, a virtual machine, such as a JIT compiler, reads the corresponding portion from the serialized IR files. The system then profiles the program to collect runtime information. The JIT compiler compiles the portion of the code using the runtime information to optimize the JIT-compiled code. The JIT-compiled code is patched to the AOT-compiled code so that the processor executes the JIT-compiled code instead of the AOT-compiled code for the corresponding portion of the program.

In an embodiment, the system deoptimizes code based on changes to runtime information detected during program execution. For example, a particular JIT-compiled function may no longer be valid if assumptions behind the optimizations are incorrect. In such cases, the system invalidates the JIT-compiled version of the code by removing this code from the instruction execution path (i.e., the code path) and restoring the original AOT-compiled machine code.

System Architecture

Figure 1:
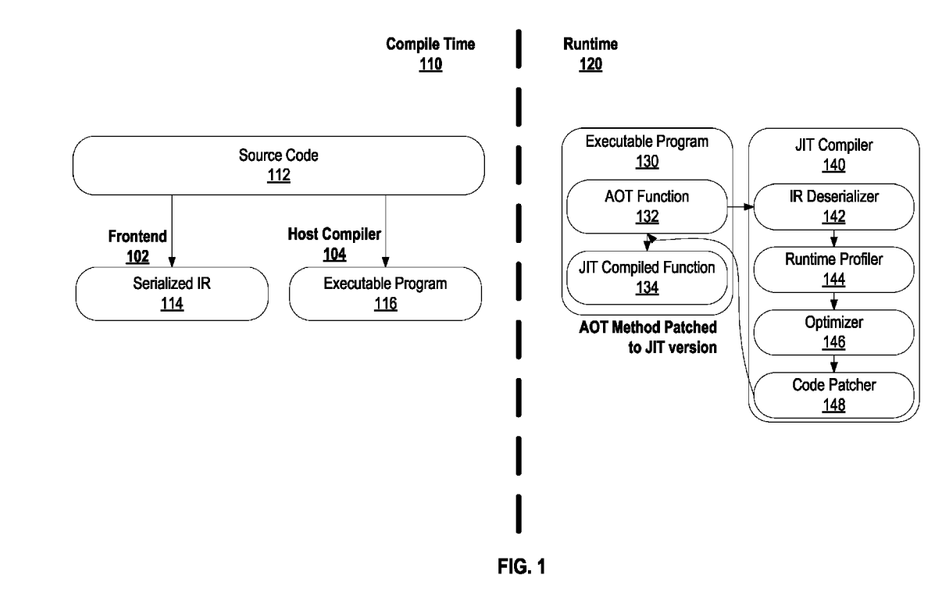
FIG. 1 is a block diagram illustrating a system architecture including a compile-time and run-time environment for unifying static and dynamic compiler optimizations, according to an embodiment.

FIG. 1 is a block diagram illustrating a system architecture including a compile-time and run-time environment for unifying static and dynamic compiler optimizations, according to an embodiment. Compile-time system 110 generally comprises host compiler 104 and frontend compiler 102. These compilers generate executable program 116 and serialized intermediate representation 114 according to techniques described in further detail below.

Runtime system 120 generally comprises executable program 130 and JIT compiler 140. Executable program 130 includes AOT function 132, which is an AOT-compiled function generated by host compiler 104 and included in executable program 116. In addition, executable program 130 includes JIT-compiled function 134 compiled by JIT compiler 140 during runtime. JIT compiler 140 generates JIT-compiled functions, including JIT-compiled function 134, from serialized IR 114 and generally comprises IR deserializer 142, runtime profiler 144, optimizer 146, and code patcher 148.

Detecting Target Functions for JIT Compilation

Figure 2:
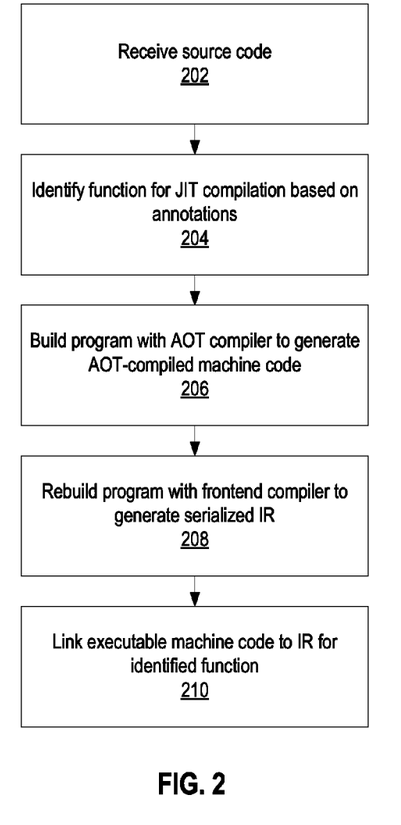
FIG. 2 is a flowchart illustrating a compile-time process for unifying static and dynamic compiler optimizations, according to an embodiment.

FIG. 2 is a flowchart illustrating a compile-time process for unifying static and dynamic compiler optimizations, according to an embodiment. In step 202, compile-time system 110 receives source code 112, which comprises a set of instructions conforming to a high-level programming language. In an embodiment, the programming language is a static programming language, such as C or C++. Alternatively, the programming language is a dynamic programming language, such as Java®.

In step 204, compile-time system 110 detects which functions of the program should be JIT compiled. A function that should be JIT compiled is hereby referred to as a "target function." The target function is any identifiable portion of the program. For example, the target function may be represented by an identifiable block of code or one or more other code fragments in source code 112.

In an embodiment, the target functions include program functions that can use runtime information for dynamic optimizations. As an example, a particular function may be compiled differently depending on the underlying hardware or the operating system installed on the platform executing the program. If supported by the underlying hardware, then the machine-code generated for the target function could leverage specialized processor instructions enabled by the platform. Target functions such as these are identified by compile-time system 110 at step 204

The portions of the program that should be JIT compiled are annotated or otherwise marked in source code 112 that is received at step 202. The annotations may be made by a human developer or an automated analysis tool that automatically identifies functions that can use runtime information. Any suitable mechanism may be used to mark the relevant portions of source code 112. In an embodiment, each function that should be JIT compiled is annotated with a preprocessor flag or macro. For example, source code 112 may be annotated with a sequence of characters such as "#JIT" that precedes each function for JIT compilation. Compile-time system 110 uses a preprocessor tool to parse source code 112 and detect the functions that have been annotated. These detected functions are the target functions that will be prepared for JIT compilation.

Dual Compilation of Source Code

In an embodiment, two different compilers are used to compile the same source code base. Each of the different compilers is an AOT-compiler that translates the source code into object code. One compiler generates an executable file comprising machine code instructions for a physical processor. The other compiler generates an IR file comprising an intermediate representation of the source code that has been serialized and can be processed by a JIT compiler.

During the compile-time process illustrated in FIG. 2, source code 112 is compiled two separate times. In step 206, host compiler 104 compiles source code 112 to generate executable program 116. In step 208, frontend compile 102 rebuilds the program to generate serialized IR 114.

Host compiler 104 generates executable program 116 by translating and converting source code 112 into machine code that is native to a physical processor. The machine code generated by host compiler 104 is herein referred to as "AOT-compiled machine code".

Host compiler 104 may be implemented using any suitable AOT compiler. If source code 112 is designed and optimized for a specific compiler, then host compiler 104 may be implemented using the specific compiler. Therefore, compiler-specific optimizations that would be difficult to replicate in a compiler redesign are easily maintained. In addition, legacy source-code bases can be compiled and obtain the benefit of JIT-compilation without any code redesign.

Executable program 116 stores a set of instructions conforming to a machine language. In an example embodiment, executable program 116 includes a set of binary-encoded instructions of a particular instructions set architecture (ISA) that can be directly loaded and executed on a physical processor, such as a CPU.

During step 208, frontend compiler 102 generates serialized IR 114 by translating and converting source code 112 to an IR. Frontend compiler 102 may be implemented using any suitable frontend compiler that translates source code 112 into an intermediate representation. In an embodiment, frontend compiler 102 is a component of host compiler 104. For example, host compiler 104 may include a frontend component that translates the source code to an IR, and a backend component that translates the IR to machine code. In an alternative embodiment, frontend compiler 102 is a separate compiler that is independent from and not a component of host compiler 104.

Serialized IR 114 stores an intermediate representation of source code 112. An IR is a set of instructions in an intermediate language, which is the language of an abstract or virtual machine. Unlike the instructions in executable program 116, the IR instructions are not directly loaded and executed on a physical processor. Rather, a virtual machine implemented in software translates the IR into machine code at runtime. An example intermediate representation includes, without limitation, Java® bytecode, which is an instruction set that is executable by a JVM. However, serialized IR 114 may store the IR of the program in any other suitable format.

Preparing Program Functions for JIT Compilation

In step 210, compile-time system 110 prepares the target functions for JIT compilation by linking the corresponding AOT-compiled machine code to the corresponding IR of the target function. The AOT-compiled machine code compiled for a target function is hereby referred to as an AOT function. The IR compiled for the target function is hereby referred to as an IR function. The AOT function and the corresponding IR function, though represented differently, are semantically equivalent and are generated from the same target function in source code 112. The AOT function is stored in executable program 116, and the IR function is stored in serialized IR 114.

In an embodiment, when compile-time system 110 identifies a target function that has been annotated, compile-time system 110 inserts additional code into source code 110 and/or executable program 116. For example, if a target function is annotated with a macro, a macro preprocessor performs a macro expansion to add the additional source code before the program is built. The additional source code causes executable program 116 to jump to JIT compiler 140 instead of executing the AOT function when the program is built in steps 204 and 206. The code further causes JIT compiler 140 to read the corresponding IR function from serialized IR 114. Accordingly, the additional code links an AOT-compiled function that should be JIT compiled to the corresponding IR function. Instead of directly executing the AOT-compiled function at runtime, the code path jumps to the JIT compiler, which dynamically compiles the IR function.

Runtime Jumping Between AOT-Compiled Code and JIT Compiler

Figure 3:
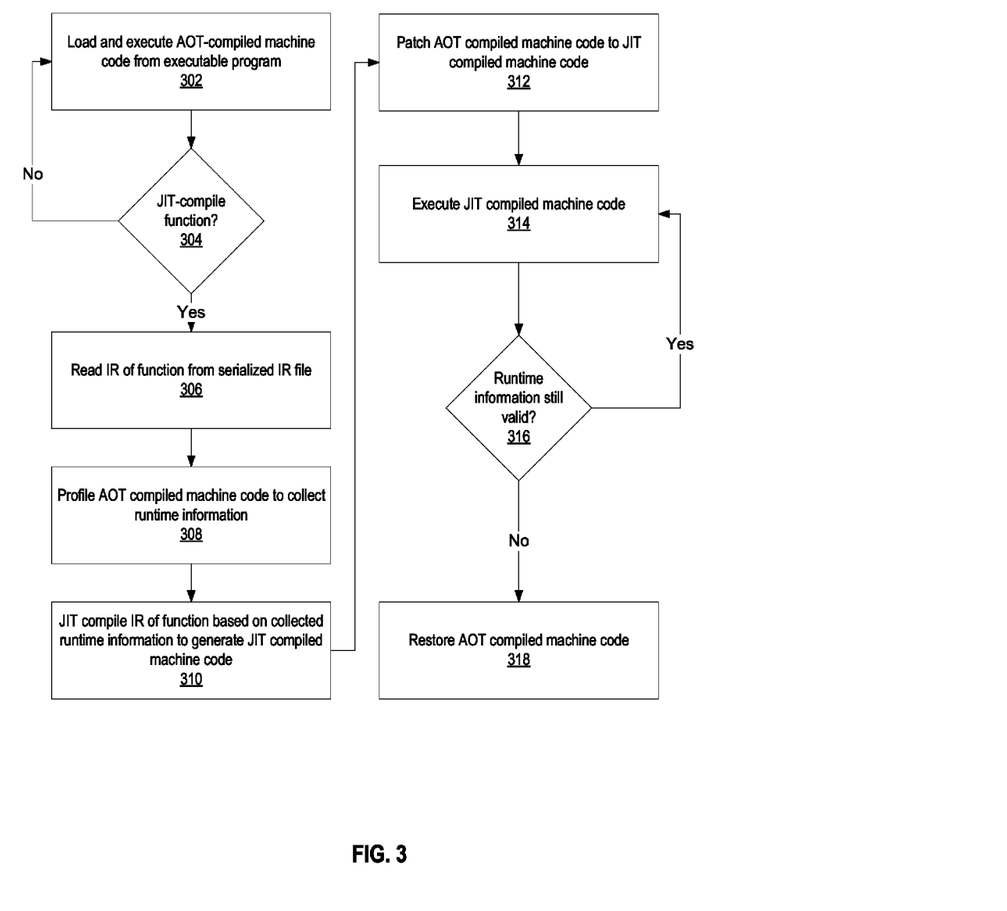
FIG. 3 is a flowchart illustrating a runtime process for unifying static and dynamic compiler optimizations, according to an embodiment.

FIG. 3 is a flowchart illustrating a runtime process for unifying static and dynamic compiler optimizations, according to an embodiment. At program startup, the physical processor begins executing AOT-compiled machine code from executable program 130 as reflected in step 302. At this point, executable program 130 is equivalent to executable program 116 as JIT compiled function 134 has not yet been generated.

The program executes according to the AOT-compiled machine code until a target function is reached. In step 304, when runtime system determines that an AOT function compiled by host compiler should be JIT compiled, the runtime process branches to step 306. In an embodiment, the runtime system detects that an AOT function should be JIT compiled based on the additional code inserted into the AOT function during the compile-time process. The additional code causes the program to jump from the static AOT-compiled instructions to the dynamic runtime environment. Accordingly, if the AOT function includes the additional code, then the runtime process invokes JIT compiler 140. If the AOT function does not include the additional code, then JIT compiler 140 is not invoked, and execution of executable program 130 continues. Runtime system 120 jumps to JIT compiler 140 the first time a target function is encountered in execution, but may not jump to the JIT compiler during subsequent executions as discussed further below.

In step 306, JIT compiler 140 reads the IR that is linked to AOT function 132 from serialized IR 114. IR deserializer 142 then deserializes the IR into a format that can be directly processed by runtime profiler 144 and optimizer 146.

In step 308, runtime profiler 144 profiles the AOT-compiled machine code of AOT function 132 to collect runtime information. In an embodiment, runtime profiler 146 collects information for at least one execution of AOT function 132. Accordingly, the physical processor executes AOT function 132 while runtime profiler 144 gathers and stores runtime information associated with the runtime state of the program. The runtime information that is collected may vary from implementation to implementation. Examples include, without limitation, frequency of execution for a particular function or other code fragment, operating system and runtime environment configurations, control flow information, global and local data flow information, and platform architecture characteristics.

In step 310, JIT compiler 140 compiles the IR function based on the collected runtime information to generate JIT compiled function 134. In an embodiment, this step involves optimizer 146 optimizing the IR of the target function. During optimization, optimizer 146 may rearrange, add, remove, or otherwise modify the IR. Example optimizations include, without limitation, inlining, control flow optimizations, and data flow optimizations. For example, frequently executed code may be merged with the calling function, the control flow of the code may be changed, and the code may be optimized for the underlying platform architecture. JIT compiler 140 generates JIT compiled function 134 by translating the optimized IR into machine code that is native to the physical processor. JIT compiled function 134 is semantically equivalent to AOT function 132.

Code Patching

Once JIT compiler 140 has generated JIT compiled function 134, code patcher 148 patches the JIT-compiled function to AOT function 132 in step 312. In an embodiment, code patcher 148 patches the two functions by inserting a jump instruction in AOT function 132 that causes the program to jump to JIT-compiled function 134.

The jump inserted by code patcher 148 may be direct or indirect, depending on the implementation. A direct jump includes the address or an address offset that identifies the target address of the JIT-compiled function. A direct jump boosts performance because the target address of JIT-compiled function 134 can be determined solely by the inserted jump instruction. Therefore, a direct jump from AOT function 132 to JIT-compiled function 134 involves very little overhead and can be quickly performed. An indirect jump, by contrast, identifies an address of a memory location where the target address of JIT-compiled function 134 is stored. The target address is loaded from the indirect address before jumping to JIT-compiled function 134.

In an embodiment, code patcher 148 replaces the jump from AOT function 132 to JIT compiler 140 with the jump to JIT compiled function 134. Thus, JIT compiler 140 is not invoked for each execution of the corresponding target function. Rather, once JIT compiled function 134 is generated, AOT function 132 jumps directly to JIT compiled function 134 without invoking JIT compiler 140. Accordingly, the target function is not JIT-compiled each time it is encountered and executed. Instead, JIT-compiled function 134 is cached for later reuse.

After JIT-compiled function 134 is patched, executable program 130 jumps to this function whenever AOT function 132 is invoked. Accordingly, the physical processor does not execute the original AOT-compiled machine code for the target function. Rather, in step 314 the physical processor executes the JIT compiled machine code of JIT compiled function 134. This code path is followed until the program terminates or JIT function 134 is invalidated.

Invalidation

During runtime, the runtime information used to optimize the JIT-compiled information may change. For example, the JIT-compiled function may inline functions or change the control flow based on commonly executed code paths detected by runtime profiler 144. Over the lifecycle of a program, the frequency with which a code path is executed may shift. In other embodiments, platform characteristics or other runtime parameters may change, depending on the particular implementation. If the optimization parameters have changed, then the previously generated JIT-compiled function may no longer be optimized and in some cases may become invalid.

In an embodiment, runtime system 120 invalidates a JIT-compiled function when the runtime information used in its optimization becomes invalid. In step 316, runtime system 120 tracks the relevant runtime information and detects changes. To track the relevant runtime information, JIT compiler 140 inserts checks into JIT compiled function 134 to determine if a runtime variable has changed since the target function was JIT compiled. These checks are run each time the JIT-compiled function is invoked. If the JIT compiled version of the target function is no longer semantically valid, then the process continues to step 318, and the JIT-compiled function is invalidated. If the runtime information remains valid, then the JIT-compiled function remains valid and is executed when the target function is invoked.

In an embodiment, runtime system 120 invalidates a JIT compiled function by restoring the original AOT-compiled function. Referring to FIG. 1, if JIT compiled function 134 is no longer valid, then the jump to this function is removed from AOT function 132. When the target function is invoked, the target function's AOT-compiled machine code that was generated by host compiler 104 is loaded and executed by the physical processor. The AOT-compiled machine code is valid regardless of the current runtime state of the program. Thus, the AOT-compiled machine code provides a stable fallback option.

In another embodiment, runtime system 120 invalidates a JIT compiled function by recompiling the JIT function. If JIT compiled function 134 is no longer valid, then the jump to this function is replaced with a jump to JIT compiler 140. JIT compiler 140 reoptimizes the IR of the target function based on the updated runtime parameters and recompiles IR to generate a new JIT compiled function. The new JIT compiled function is then patched to AOT function 132 and executed. Recompilation involves some overhead. In an embodiment, to reduce the effects of this overhead, runtime system 120 tracks invalidation statistics. If runtime system 120 determines that a particular function is invalidated and/or recompiled above a threshold number or frequency, then runtime system 120 restores the original AOT-compiled function.

Invalidation allows optimizer 146 to perform more aggressive optimizations. If the assumptions behind the dynamic optimizations fail, then there is a fallback mechanism to ensure correct execution of the target function.

Swapping Functions into and Out of a Program

In an embodiment, runtime system 120 removes unused or disabled target functions out of the code path. For example, a certain function in source code may only be applicable if the executing platform has a particular platform characteristic. Example platform characteristics include, without limitation, the platform hardware, installed drivers, and operating system version. If the platform characteristic is not present, then the function is disabled and completely taken out of the code path by JIT compiler 140. Accordingly, the target function is no longer invoked during runtime. This reduces the attack surface of the program, enabling more secure code.

In another embodiment, runtime system 120 adds a particular function into the code path when the function is enabled. For example, the function may be dependent on platform specific functionality. When runtime system 120 detects that the platform specific functionality is added during runtime, JIT compiler 140 inserts the particular function into the code path. If the platform-specific functionality later becomes disabled, then the function is swapped back out of the code path. Therefore, JIT compilation enables modules dependent on hardware to be linked during runtime, similar to an operating system loading and unloading new hardware drivers on the fly. This reduces the static size footprint of the program while still enabling functionality.

Pausing Execution

In an embodiment, runtime system 120 is configured to temporarily pause execution of targeted parts of the program. The reasons for pausing these targeted program parts may vary from implementation to implementation. For example, runtime system 120 may receive notification of a program bug. In response to the notification, JIT compiler 122 recompiles the program to patch the bug and replaces the error without halting the entire program.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
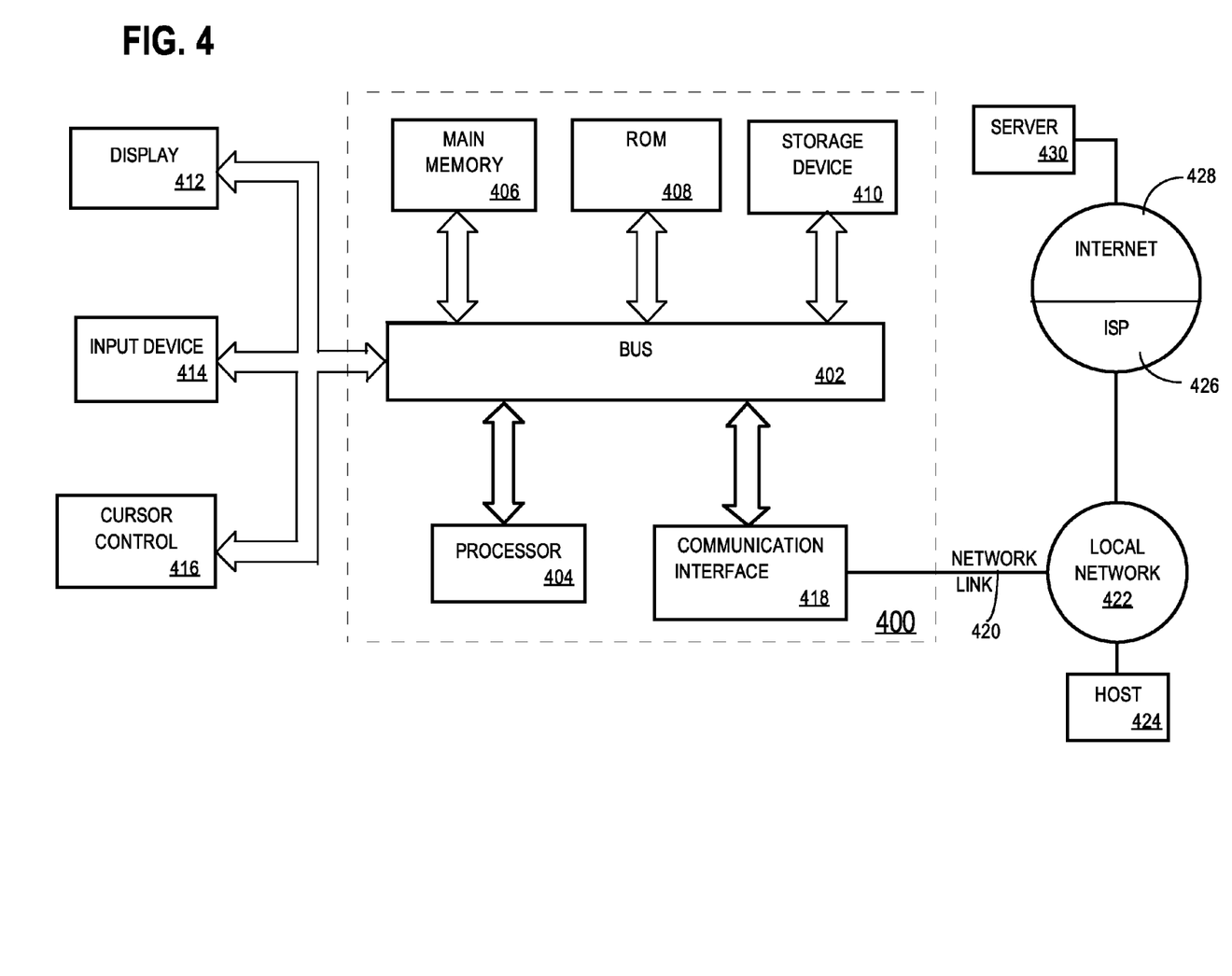
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    executing ahead-of-time (AOT) compiled code for a particular program;
    detecting that a target function of the particular program should be just-in-time (JIT) compiled;
    in response to detecting that the target function of the particular program should be JIT compiled,
        generating a JIT-compiled version of the target function;
        patching an AOT-compiled version of the target function to the JIT-compiled version of the target function; and in response to patching the AOT-compiled version of the target function to the JIT-compiled version of the target function, executing the JIT-compiled version of the target function in place of the AOT-compiled version when the target function is invoked;

wherein the method is performed by one or more computing devices.

2. The method of claim 1, wherein the JIT-compiled version of the target function is generated based on an intermediate representation of the target function.

3. The method of claim 1, wherein patching the AOT-compiled version of the function to the JIT-compiled version of the target function comprises:

replacing a jump instruction to the JIT compiler with a jump instruction to the JIT-compiled version of the target function.

4. The method of claim 3, wherein the jump instruction is a direct jump.

5. The method of claim 1 further comprising:

detecting that the JIT-compiled version of the target function is no longer semantically valid;

in response to detecting that the JIT-compiled version of the target function is no longer semantically valid, invalidating the JIT-compiled version of the target function.

6. The method of claim 5, wherein invalidating the JIT-compiled version of the target function comprises:

restoring the AOT version of the target function;

wherein restoring the AOT version of the target function comprises executing the AOT version of the target function and not the JIT compiled version when the target function is invoked.

7. The method of claim 5, wherein invalidating the JIT-compiled version of the target function comprises:

reoptimizing an intermediate representation of the target function based on updated runtime information;

recompiling the intermediate representation to generate a new JIT compiled function.

8. The method of claim 1, further comprising:

adding a previously disabled function to the AOT compiled code during runtime in response to detecting that the previously disabled function has become enabled.

9. One or more non-transitory computer-readable media storing instructions, which, when executed by one or more processors, cause one or more computing devices to perform operations comprising:

executing ahead-of-time (AOT) compiled code for a particular program;

detecting that a target function of the particular program should be just-in-time (JIT) compiled;

in response to detecting that the target function of the particular program should be JIT compiled, generating a JIT-compiled version of the target function;

patching an AOT-compiled version of the target function to the JIT-compiled version of the target function; and in response to patching the AOT-compiled version of the target function to the JIT-compiled version of the target function, executing the JIT-compiled version of the target function in place of the AOT-compiled version when the target function is invoked.

10. The non-transitory computer-readable media of claim 9, wherein the JIT-compiled version of the target function is generated based on an intermediate representation of the target function.

11. The non-transitory computer-readable media of claim 9, wherein instructions for patching the AOT-compiled version of the function to the JIT-compiled version of the target function comprise instructions for:

replacing a jump instruction to the JIT compiler with a jump instruction to the JIT-compiled version of the target function.

12. The non-transitory computer-readable media of claim 11, wherein the jump instruction is a direct jump.

13. The non-transitory computer-readable media of claim 9 wherein the instructions further cause the one or more computing devices to perform operations comprise instructions for:

detecting that the JIT-compiled version of the target function is no longer semantically valid;

in response to detecting that the JIT-compiled version of the target function is no longer semantically valid, invalidating the JIT-compiled version of the target function.

14. The non-transitory computer-readable media of claim 13, wherein instructions for invalidating the JIT-compiled version of the target function comprise instructions for:

restoring the AOT version of the target function;

wherein restoring the AOT version of the target function comprises executing the AOT version of the target function and not the JIT-compiled version when the target function is invoked.

15. The non-transitory computer-readable media of claim 14, wherein instructions for invalidating the JIT-compiled version of the target function comprise instructions for:

reoptimizing an intermediate representation of the target function based on updated runtime information;

recompiling the intermediate representation to generate a new JIT compiled function.

16. The non-transitory computer-readable media of claim 9, wherein the instructions further cause the one or more computing devices to perform operations comprising:

adding a previously disabled function to the AOT compiled code during runtime in response to detecting that the previously disabled function has become enabled.

* * * * *

UNITED STATES PATENT AND TRADEMARK OFFICE
CERTIFICATE OF CORRECTION

| | |
|---|---|
| PATENT NO. | : 8,959,495 B2 |
| APPLICATION NO. | : 13/620124 |
| DATED | : February 17, 2015 |
| INVENTOR(S) | : Chafi et al. |

Page 1 of 1

It is certified that error appears in the above-identified patent and that said Letters Patent is hereby corrected as shown below:

In the specification

In column 2, lines 29-30, delete "implemented;" and insert -- implemented. --, therefor.

In column 4, line 10, delete "204" and insert -- 204. --, therefor.

Signed and Sealed this
Seventeenth Day of November, 2015

Michelle K. Lee
*Director of the United States Patent and Trademark Office*